Dec. 15, 1931.  W. E. BOYLE  1,836,570
ELECTRICAL CABLE AND METHOD OF MANUFACTURE THEREOF
Filed July 11, 1925
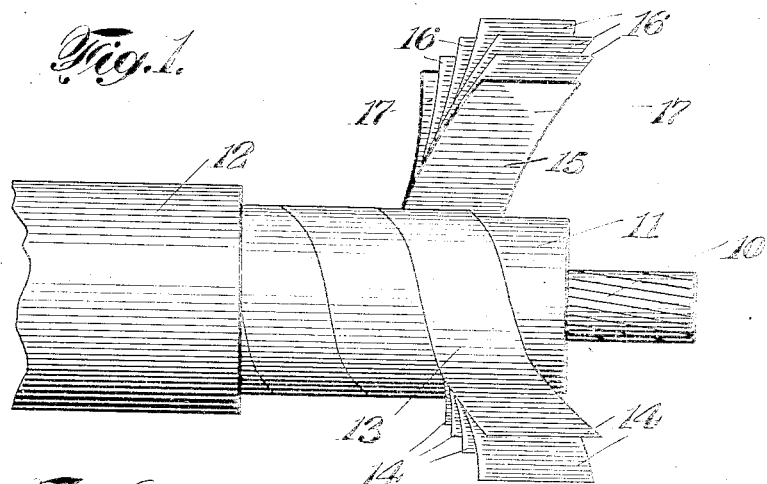
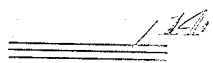
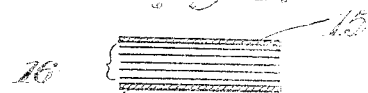
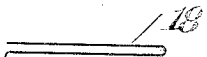
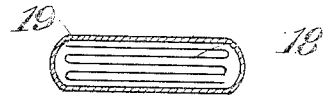
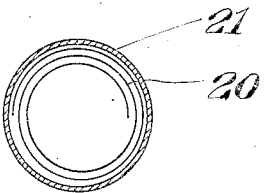
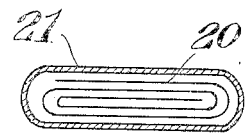
Inventor
William E. Boyle.
By his Attorneys Patented Dec. 15, 1931

1,836,570

UNITED STATES PATENT OFFICE

WILLIAM E. BOYLE, OF NEW YORK, N. Y., ASSIGNOR, BY MESNE ASSIGNMENTS, TO GENERAL CABLE CORPORATION, OF NEW YORK, N. Y., A CORPORATION OF NEW JERSEY

ELECTRICAL CABLE AND METHOD OF MANUFACTURE THEREOF

Application filed July 11, 1925. Serial No. 43,031.

The present invention relates to paper insulated cable particularly underground and to the manufacture thereof, the object of the invention being to produce a cable which will be more satisfactory in operation than cables now available.

In the distribution of electrical energy it is customary, under certain circumstances, to provide cables which may be laid underground and obviously such cables must be well insulated and protected to avoid the loss of electrical energy in transmission. The problem of insulating such cables satisfactorily is an exceedingly difficult one, particularly where it is desired to use alternating currents of high voltage as is usually the case because the transmission of energy in this manner is the most economical.

The type of cable most widely used at the present time consists essentially of a stranded copper conductor tightly wound with a number of layers of paper impregnated with a suitable compound and covered with a lead sheath. The method of manufacture most generally employed consists essentially in wrapping the conductor with the successive layers of paper, placing the cable thus formed in a vacuum drying chamber and, after a considerable length of time, impregnating the cable with an oil base compound and then conducting the same to a lead press for the purpose of applying the lead sheath. The size of the conductor and thickness of insulation depend of course upon the use for which the cable is designed and the precise method of manufacture varies with different manufacturing concerns. The paper is usually applied helically with normal lay and one layer at a time, there being in the usual cabling machine a number of fliers or spools of paper tape mounted to revolve about the axis of the conductor as the same is moved slowly forward. Paper made from manila rope or wood pulp stock is usually employed and is of a thickness of about .004 to .009 of an inch (4 to 9 mils) the requisite number of layers being built up as above indicated.

It would be desirable to use a greater number of layers of thinner and denser paper but the difficulty of applying such a paper with its relatively low tensile strength has heretofore prevented its use. In accordance with the present invention I propose to use a paper of pure linen rag stock such as is now sometimes referred to as "condenser paper", having a thickness of approximately .0005 of an inch (one half mil) and to provide a construction and method of procedure whereby this character of paper may be successfully incorporated in the insulation of the cable.

The use of a plurality of layers of thin paper is particularly desirable because several layers placed together and having the same total thickness as a single layer, possess far greater insulating properties and greater flexibility. Instantaneous voltage break-down tests which I have conducted show that the dielectric strength of an oil impregnated piece of paper 4 mils in thickness is approximately 627 volts per mil, whereas the same thickness of paper built up with several laminae of the above mentioned thin paper using the same oil for impregnation gives a dielectric strength of approximately 3000 volts per mil under the same conditions.

In the accompanying drawings illustrative of the invention, Figure 1 is a plan view of a cable embodying the present invention and Figures 2 to 7 inclusive are cross sections of insulating tape which will be later described.

Assuming that it is desired to follow the present standard practice in respect to the impregnation of the cable after it has been formed, my invention contemplates the use of a laminated tape, that is a tape having several layers of paper, in place of the single thickness tape which is now used. For example, I may use the above mentioned linen rag stock paper of one-half mil thickness and bring together five thicknesses of said paper and apply the same in the usual manner as a single strip or tape. The laminated tape may be conveniently formed by folding the paper upon itself or by bringing together the requisite number of independent strips.

In order to increase the tensile strength of the laminated strip so that it may withstand the strains incident to its application to the conductor and for the further purpose of giving the strip additional tensile strength to resist bending strains in the cable during its manufacture and installation, I may enclose the layers of very thin paper within an envelope of a stronger paper such as a manila rope stock paper or kraft paper or any other paper possessing high mechanical strength of approximately .002 of an inch (2 mils) in thickness thus providing a strip of approximately .0065 of an inch (6½ mils) before impregnation for handling in a cabling machine.

Referring to the accompanying drawings and particularly to Figure 1, a conductor 10 is shown surrounded by wrapped insulation 11 and enclosed in a lead sheath 12. As will be readily understood, the insulation 11 is built up by successive wrappings or layers of paper tape and, in the present instance, the tape 13 comprises five layers 14 of thin linen rag stock paper of one-half mil thickness which are brought together as above described and applied to the cable as a single strip or tape. A cross section of this tape is shown in Figure 2.

Another tape 15 is shown as comprising five strips 16 of the above mentioned thin paper enclosed between two layers 17 of thicker and stronger paper such as a manila rope stock or kraft paper of approximately 2 mils in thickness. A cross section of this tape is shown in Figure 3.

Figure 4 is a cross section of a thin tape 18 folded upon itself as above described to form a laminated tape for application to the cable, and Figure 5 is a cross section of such a laminated tape enclosed within an envelope 19 of stronger and thicker paper as above described.

Suitable folding apparatus may be used to form the laminated strip and its envelope or a broad strip of the linen paper may be formed into a multi-wall tube, covered with a single wall tube of the thicker paper as shown in Figure 6, wherein 20 designates the thin paper and 21 the thicker paper and flattened to form the tape, as shown in Figure 7.

In whichever way the tape is formed it may be supplied on spools in the usual way to the cabling machine and there placed in position upon the conductor after which the paper covered conductor may be subjected to the usual vacuum drying and impregnation steps.

It is further contemplated, however, that the paper may be wholly or partly impregnated prior to its application to the cable and in that event the paper in laminated strip form or in the tube form as the case may be, may be led over suitable guides to a drying oven which should be maintained at a temperature of approximately 106° C., and the apparatus so arranged that the paper remains in this oven for approximately 30 minutes to three hours or until all moisture is dried out. Then, without contact with the air, the paper may be fed to an impregnating oil of petroleum base such as is now commonly used in American practice. This oil should be maintained at a temperature of approximately 116° C. When sufficient time has elapsed for the paper to become thoroughly impregnated with this oil it may be led to a second bath of similar oil maintained at a lower temperature of approximately 50° C., and from that bath the paper may be led to and subjected to the action of squeegee rolls or some equivalent device to firmly unite the layers of paper to each other and exclude air therefrom.

In the event that the paper is thus wholly or partly impregnated prior to its application to the conductor the finished cable may be subjected to the usual drying and impregnating processes or in the course of manufacture subjected to a hot oil bath between the successive applications of the several layers of laminated tape.

In any event, after assembly of the conductor and insulation and the impregnation thereof the lead sheath or other flexible mechanical protection may be applied.

A cable constructed as above described will have a far greater dielectric strength than cables constructed in accordance with present methods. This will enable cables of the same over-all diameter to be used for the transmission of power at higher voltages or will permit of a reduction in the over-all diameter of cables for use with equal voltages. Furthermore, the character of the paper used will render the impregnating compound less fugitive under service conditions and for these and other reasons cables embodying and constructed in accordance with the present invention will be more efficient and durable in operation.

The invention may be variously modified and embodied within the scope of the subjoined claims.

I claim as my invention—

1. A cable for the distribution of electrical energy at high voltages comprising, in combination, a stranded conductor, an outer moisture proof sheath, and an intermediate body of insulating material including a plurality of layers of paper tape composed of a plurality of layers of dense paper not exceeding one-half mil in thickness assembled in face-to-face relationship.

2. A cable for the distribution of electrical energy at high voltages, comprising, in combination, a stranded conductor, an outer moisture proof sheath, and an intermediate body of insulating material including a plurality of layers of paper tape composed of a plurality of layers of impregnated dense paper approximately one-half mil in thickness assembled in face-to-face relationship.

3. A cable for the distribution of electrical energy comprising in combination a conductor, an outer moisture proof sheath and an intermediate body of insulating material comprising a plurality of layers of paper tape, each tape being composed of a plurality of layers of relatively thin paper and a surrounding envelope of relatively thick paper.

4. A cable for the distribution of electrical energy comprising in combination a conductor, an outer moisture proof sheath and an intermediate body of insulating material comprising a plurality of layers of paper tape, each tape being composed of a plurality of layers of paper of low tensile strength and a surrounding envelope of paper of higher tensile strength.

5. A cable for the distribution of electrical energy comprising in combination a conductor, an outer moisture proof sheath and an intermediate body of insulating material comprising a plurality of layers of paper tape, each tape being composed of a plurality of layers of thin impregnated paper and a surrounding envelope of thicker and stronger impregnated paper.

6. A cable for the distribution of electrical energy comprising in combination a conductor, an outer moisture proof sheath and an intermediate body of insulating material comprising a plurality of layers of paper tape, each tape being composed of a plurality of layers of paper not exceeding one-half mil in thickness and a surrounding envelope of paper of approximately two mils in thickness.

7. The improvement in the art of cable making which consists in applying thereto a unitary tape comprising a plurality of layers of paper approximately one-half mil in thickness.

8. A cable for the distribution of electrical energy comprising, in combination, a conductor, an outer moisture proof sheath, and an intermediate body of insulating material including a plurality of layers of paper tape, said tape comprising a plurality of layers of thin, dense paper and a layer of relatively thicker paper assembled in face-to-face relationship for unitary application to the cable.

9. A cable for the distribution of electrical energy comprising, in combination, a conductor, an outer moisture proof sheath, and an intermediate body of insulating material including a plurality of layers of insulating tape, said tape comprising a plurality of layers of thin, dense paper of low tensile strength and a layer of fibrous material of higher tensile strength assembled in face-to-face relationship for unitary application to the cable.

10. A cable for the distribution of electrical energy comprising, in combination, a conductor, an outer moisture proof sheath, and an intermediate body of insulating material including a plurality of layers of paper tape, said tape comprising a plurality of layers of thin, dense paper and a plurality of layers of relatively thicker paper assembled in face-to-face relationship for unitary application to the cable.

11. A cable for the distribution of electrical energy comprising, in combination, a conductor, an outer moisture proof sheath, and an intermediate body of insulating material including a plurality of layers of insulating tape, said tape comprising a plurality of layers of thin, dense paper of low tensile strength and a plurality of layers of fibrous material of higher tensile strength assembled in face-to-face relationship for unitary application to the cable.

In testimony whereof, I have signed my name to this specification this 10th day of July, 1925.

WILLIAM E. BOYLE.